Oct. 17, 1967  C. C. PERRY  3,347,089
CONTINUOUS IN-LINE VISCOMETER
Filed Nov. 9, 1964  2 Sheets-Sheet 1
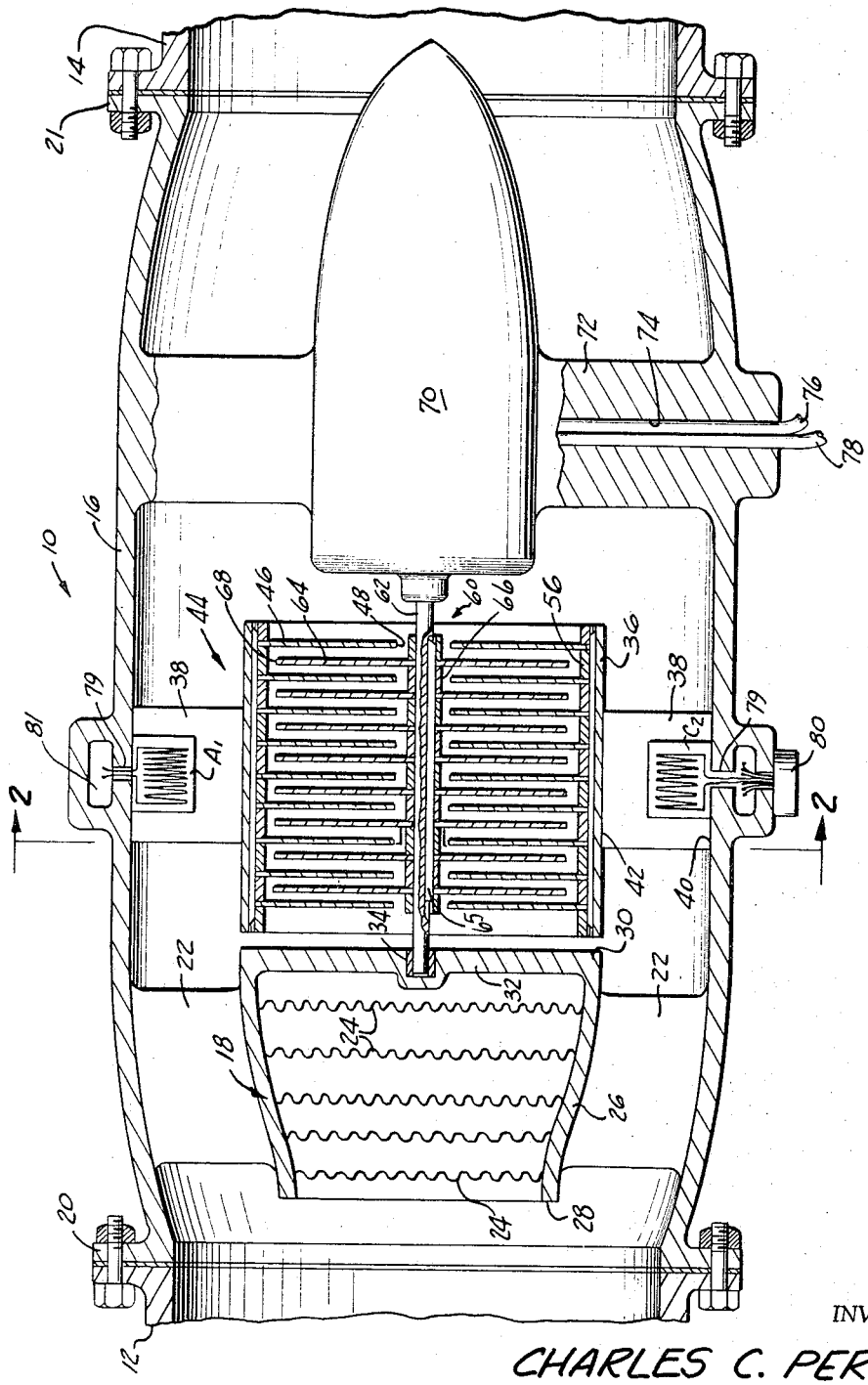
INVENTOR
CHARLES C. PERRY
BY *Olsen and Stephenson*
ATTORNEYS Oct. 17, 1967     C. C. PERRY     3,347,089
CONTINUOUS IN-LINE VISCOMETER Filed Nov. 9, 1964     2 Sheets-Sheet 2

INVENTOR
CHARLES C. PERRY
BY *Olsen and Stephenson*
ATTORNEYS

United States Patent Office 3,347,089
Patented Oct. 17, 1967

3,347,089
CONTINUOUS IN-LINE VISCOMETER
Charles C. Perry, 9725 Waters Road,
Ann Arbor, Mich. 48103
Filed Nov. 9, 1964, Ser. No. 409,820
4 Claims. (Cl. 73—59)

ABSTRACT OF THE DISCLOSURE

A continuous in-line viscometer in which a tubular stator has fluid moving longitudinally through it and is mounted on flexible struts which deflect when a torque is applied to the stator. A rotor extends into the stator and applies a torque to fluid moving therethrough so that the stator mounting struts will be flexed, and the magnitude of flexing can be measured to provide an indication of the viscosity of the fluid flowing through the stator.

---

This invention relates generally to viscometers, and more particularly to a continuous in-line viscometer adapted for direct connection into any line, pipe, or conduit through which a fluid or fluidlike material moves and which is capable of producing a continuous electrical signal which is related to the viscosity of the material in the line.

In many systems which involve a flow of fluid or fluid-like material through a line, the viscosity of the material is proportional to or related to or indicative of a characteristic of the material which it is desired to sense and control in the system. It is desirable, therefore, to have a viscometer which can be connected directly into a line in such a system and which will produce a continuous electrical signal proportional to or indicative of the viscosity of the material in the line, cannot be rendered inaccurate by unpredictable frictional forces, and assures laminar flow of the fluid being tested as to viscosity. It is an object of this invention, therefore, to provide an improved continuous in-line viscometer capable of accomplishing the above-described objectives.

Another object of this invention is to provide an improved viscometer in which friction in the viscometer cannot directly affect viscosity measurements, in which laminar flow is assured to thereby avoid inaccuracies caused by turbulent flow, and which is directly connected in a line so that the amount of fluid which is diverted from its normal flow path is small to thereby minimize the effect of the viscometer on the system.

In the viscometer of this invention, a stator tube is mounted in an in-line relation with the fluid or fluidlike material to be tested and controlled. For simplicity of explanation, the material with which the viscometer of this invention is usable is hereinafter described as simply a "fluid" which term as used herein is inclusive of any flowable material whether or not it is in fact a true Newtonian fluid. The stator tube is mounted on stationary flexure struts which are bendable in a direction transversely to the direction of flow of the fluid in response to the application of a torque thereto by the stator tube. A diffuser is positioned adjacent the inlet end of the stator tube for reducing the velocity of the fluid and for providing a laminar flow of the fluid into the stator tube. Means are provided in the stator tube for applying a continuous torque of uniform magnitude to the material flowing therethrough so as to move this fluid in a direction such that it will apply torques that are transmitted to the stator tube in a direction to bend the flexure struts transversely to the direction of flow of the fluid. The magnitude of the deflection of the struts is related to the viscosity of the fluid flowing through the stator tube since the viscosity of the fluid determines the extent to which the fluid is capable of transmitting torques to the stator tube. This arrangement provides for a very sensitive measurement of the viscosity of the fluid since strain gauges or the like can be readily applied to the struts to accurately measure their deflection without any of the other forces applied to the struts by the flowing fluid having any effect on the measurement of the deflection. Strain gauges are likewise readily connectible in a recording or control circuit.

Further objects, features and advantages of this invention will become apparent from a consideration of the following description, the appended claims, and the accompanying drawing in which:

FIGURE 1 is a longitudinal sectional view of the internal sampling device of this invention, showing the device connected in a pipeline, only fragmentary portions of which are shown;

Figures 2, 5:
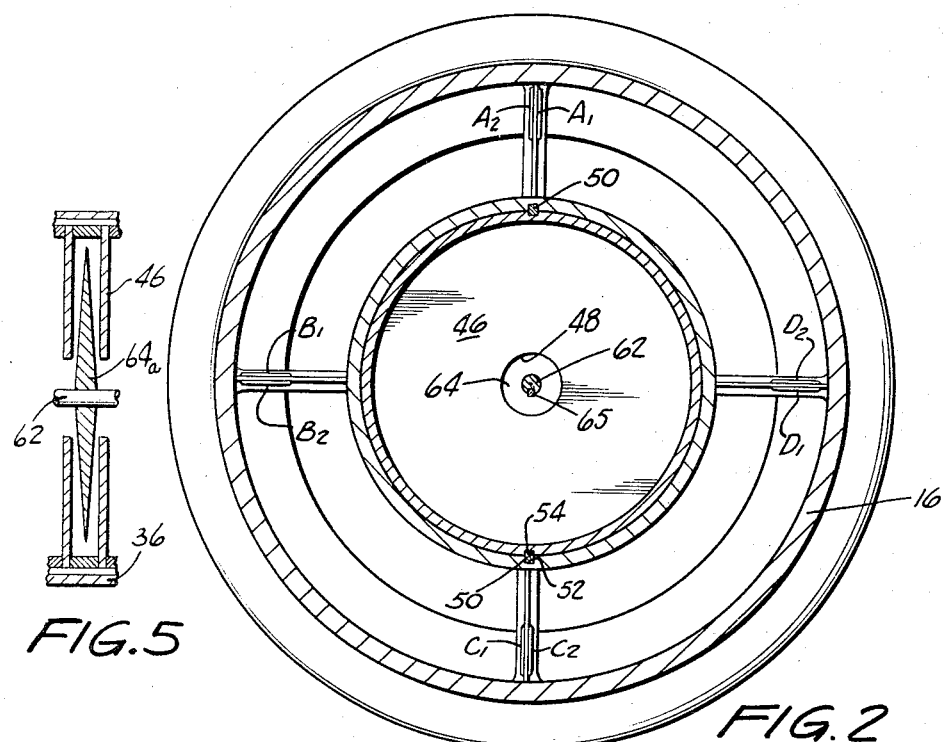
FIGURE 2 is a transverse sectional view looking substantially along the line 2—2 in FIG. 1, showing the stator supporting struts in undeflected positions.
FIGURE 5 is a fragmentary view illustrating a modified form of rotor disc usable in the viscometer of this invention.

With reference to the drawing, the viscometer of this invention, indicated generally at 10, is illustrated in FIG. 1 connected directly into a pipeline which includes pipe sections 12 and 14 which are connected to opposite ends of the device 10 so as to be in an in-line relationship therewith. The device 10 consists of a housing or pipe section 16 which is flange connected at its ends 20 and 21 to the pipe sections 12 and 14 and is of a size such that the device 10 constitutes little or no obstruction to the desired flow of fluid through the sections 12 and 14. A diffuser 18, arranged in a substantially coaxial relation with the housing 16 adjacent the inlet end 20 thereof, is supported on struts 22 which extends radially outwardly from the diffuser 18 and are secured to the housing 16. In the illustrated embodiment of the invention, the diffuser 18 is shown as having a plurality of fine mesh screens 24 spaced apart in a direction axially of the housing 16 and mounted within a tubular frame 26 which forms the diffuser 18 and is of an increasing diameter in a downstream direction. The frame 26 has an end 28 which constitutes an inlet end, and an end 30 which constitutes an outlet end and on which a spiderlike support 32 is mounted for a bearing 34, the purpose of which will be explained presently.

The diffuser 18 is of a progressively increasing size in internal cross section so that the velocity of the fluid which passes therethrough is smoothly reduced to produce laminar flow at the outlet end 30. The screens 24 are desirable but not essential for the purpose of stabilizing the laminar flow. The struts 22 and the spider 32 are preferably streamlined so as to create as little turbulence as possible in the fluid flowing through the housing 16. A stator assembly 44 includes a tube 36, positioned adjacent the outlet end 30 of the diffuser 18 and arranged in a substantially coaxial relation therewith. A rotor assembly 60 positioned in the tube 36 is capable of applying a continuous torque of uniform magnitude to fluid flowing through the tube 36 so that the fluid will in turn apply torques to the tube 36. In the viscometer 10 of this invention means are provided for sensing and continually measuring the magnitude of the reaction of the tube 36 to these fluid torques, since this reaction is related to the viscosity of the fluid. In the illustrated embodiment of the invention this means consists of a plurality of thin sheet metal struts 38 secured to the pipe section 16 and extending radially inwardly therefrom. Each strut 38 has an outer end 40 which is secured to the inner surface of the housing 16 so that it cannot move relative thereto, and an inner end 42 which is similarly secured to the stator tube 36 so that no movement therebetween is permitted.

The stator assembly includes a plurality of discs 46 attached at their outer edges to the inner periphery of the stator tube 36, and each of which is formed with an axial opening 48. In the illustrated embodiment of the invention, the discs 46 are secured to the stator tube 36 by means of keys 50 disposed in cooperating keyways 52 and 54 in the tube 36 and the discs 46, respectively. The keys 50 function to fix the outer rims or edges of the discs 46 to the tube 36. A plurality of ring-shaped spacers 56, each of which has an outer diameter corresponding substantially to the inner diameter of tube 36, are positioned in the tube 36 between adjacent discs 46 so as to maintain the discs 46 in a predetermined axially spaced relation. The keys 50 permit removal of the discs 46 from the tube 36 for replacement and use with spacers 56 of different lengths to thereby provide a versatile stator assembly 44 which can be adjusted to provide a predetermined desired number and spacing of discs 46.

The rotor assembly consists of a shaft 62 to which a plurality of rotor discs 64 are fixed, with the rotor discs 64 being arranged so that each rotor disc 64 is positioned between a pair of adjacent stator discs 46. In the illustrated embodiment of the invention, a key 65, which fits in radially aligned keyways in the shaft 62 and the inner edges of the rotor discs 64, functions to secure the discs 64 to the shaft 62, and spacer rings 66 are mounted on the shaft 62 between adjacent discs 64 so as to maintain the discs 64 in predetermined spaced relation. The key 65 is thus removable to remove the discs 64 from the shaft 62 so that different length spacer rings 66 can be used to provide a desired number and spacing of discs 64 on the shaft 62.

Each disc 64 is of a diameter such that its outer edge 68 is spaced inwardly from the stator disc spacers 56. As a result, fluid flowing into the stator tube 36 from the diffuser 18 must follow a tortuous path through the tube 36 which insures the tube 36 being substantially filled at all times with fluid which is in intimate contact with adjacent surfaces of adjacent stator and rotor discs 46 and 64. The arrangement of discs 46 and 64 in this manner assures a laminar flow of low velocity fluid through tube 36. Flow rates and pressures in the line in which housing 16 is disposed also have little effect on the fluid in tube 36 since only a small amount of fluid flows through the tube 36 and the discs 46 and 64 contain the flow of this fluid.

Figure 3:
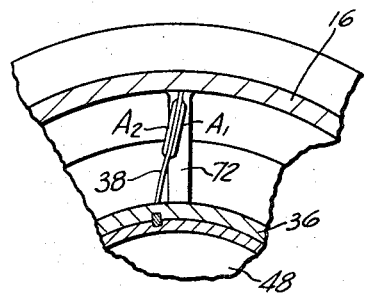
FIGURE 3 is a fragmentary transverse sectional view, illustrated similarly to FIG. 2, showing a strut in a deflected position.

Consequently, when the rotor shaft 62 is rotated at constant speed, viscous shear stresses are induced between the rotor discs 64 and the stator discs 46. These shear stresses react on the stator discs 46 to produce a torque on the stator tube 36. The struts 38 on which the stator tube 36 is supported are formed of thin sheet metal, and as a result, in response to this torque on the stator tube 36, the flexure struts 38 will flex or deflect as shown in FIG. 3. Electrical strain gauges, of well known type, indicated at A1, A2, B1, B2, C1, C2, D1, and D2 in FIG. 2, are mounted so that a pair of strain gauges are secured to opposite sides of each strut 38. Each of the strain gauges is formed and circuit connected so that when it is stressed in compression it produces an electrical signal of one sign, and when it is stressed in tension it produces an electrical signal of the opposite sign. Strain gauges are commonly used for indicating stresses and strains in structural members; in the device 10 the strain gauges are used for measuring deflection of struts 38.

In the illustrated embodiment of the invention, the driver shaft 62 is connected to and driven by a submersible electric motor 70 which is mounted on a transverse streamlined strut 72 which extends diametrically across the housing 16. The strut 72 is formed with a passage 74 through which the electrical leads 76 and 78 for motor 70 are extended.

Figure 4:
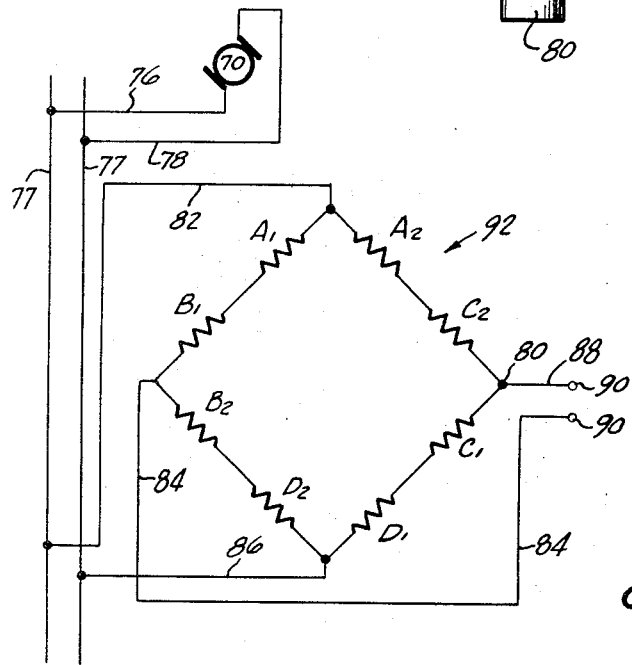
FIGURE 4 is a circuit diagram illustrating the strain gauges, which are mounted on the struts, connected in a control or indicating circuit.

As shown in FIG. 4, the motor leads 76 and 78 are connected to conductors 77 connected to any suitable source of electric current. Each of the strain gauges has the leads therefore extended through a small opening 79 in the housing 16 adjacent the outer end of the strut 38 on which the strain gauge is mounted. The leads from the strain gauges extend from the openings 79 into an annular conduit 81 which extends around the housing 16. An external electric plug 80 is connected to the strain gauge leads. The plug 80 can then be connected to conductors 82, 84, 86, and 88 to form the Wheatstone bridge circuit 92 shown in FIG. 4 which is connected across the conductors 77.

In the operation of the device 10, the drive motor 70 is operated to turn the rotor discs 64 at a constant speed so that the viscous forces induced by the rotor discs 64 on the stator discs 46 operate to apply a rotational torque to the stator tube 36 which in turn deflects the struts 38 as shown in FIG. 3. Such a deflection affects the electrical conductivity of the strain gauges A1, A2, etc. such that when the strain gauges are connected in the bridge circuit 92, shown in FIG. 4, which is a sensing circuit well known, the extent of deflection of the struts 38 is readily measured at the terminals 90 for the leads 84 and 88. The leads 90 are connected through the usual amplifier and sensitivity network (not shown) to an instrument (not shown) which continually indicates a value that is related to the viscosity of the fluid in the stator tube 36.

As a result, when the device 10 of this invention is installed in a system, a continual measurement of a value proportional or related to the viscosity of the fluid in the system is provided. This value may also be proportional to other characteristics of the fluid which it is desired to control. Also, the apparatus which is supplying raw material to the system may be connected to the instrument so that the supply apparatus is automatically adjusted to maintain a predetermined viscosity determined by the device 10.

FIG. 5 illustrates a modified form of rotor disc 64a which is preferred in some cases, particularly when the viscometer 10 is used in connection with non-Newtonian fluids. The disc 64a has non-parallel surfaces, and as a result each disc surface is closest to the adjacent stator disc 46 at the inner edges of the adjacent discs. As a result, faster velocity fluid adjacent the periphery of disc 64a has a larger space in which to move than the fluid adjacent the shaft 62. Accordingly, a more uniform application of shear stress to the stator discs 46 is obtained over the entire surface thereof.

From the above description it is seen that this invention provides an internal sampling device 10 which can be directly connected into any line, pipe or conduit through which a fluid substance moves, so as to produce a continuous electrical signal at the leads 90 which is related to the viscosity of the fluid in the line. The function of the diffuser 18 is to provide for a laminar flow of the fluid flowing into the stator tube 36, and the resistance of discs 46 and 64 insures laminar flow in the tube 36. The sensitivity of the viscometer 10 is readily pre-established by the length, width and thickness chosen for the supporting struts 38, the modulus of elasticity of the material selected for the struts 38, and the number and spacing of the discs 46 and 64. Also, the cross-sectional area occupied by the stator tube 36 is preferably very small in comparison to the cross-sectional area of the housing 16, so that the device 10 has little effect on the overall flow of fluid through the housing 16. In a preferred embodiment, the tube 36 is much smaller in relation to the diameter of the housing 16 then illustrated in the drawing, so that only one to ten percent of the fluid flowing through housing 16 will flow through the tube 36. In any event, the use of the strain gauges A1, A2, etc. provide for a sensitive device 10 which is operable to accurately measure and in some cases control the viscosity of the fluid in the system, since any friction developed in the viscometer 10 cannot affect the accuracy.

It will be understood that the internal sampling device which is herein disclosed and described is presented for purposes of explanation and illustration and is not intended to indicate limits of the invention, the scope of which is defined by the following claims.

What is claimed is:

1. A viscometer comprising means forming a passage for a fluid to flow in one direction, tubular stator means disposed in a portion of said passage means in a spaced relation therewith so that the axes of said stator means and said passage means are substantially parallel and so that some of the fluid flowing in said passage means in said one direction will enter one end of said stator means, flexure struts mounting said tube on said passage means, means extending into said stator means for applying a torque to fluid therein to thereby rotate said stator means and bend said struts in a direction transversely of said passage means a distance related to the viscosity of fluid in said stator means, and diffuser means in said passage mean adjacent to said one end of said stator means providing for laminar flow of fluid into said one end of said stator means.

2. A viscometer comprising means forming a passage for a fluid to flow in one direction, stator means comprising a tube and a plurality of ring shaped discs in said tube disposed in a fixed relation with respect to said tube and in an axially spaced relation with each other, flexure struts mounting said tube in said passage means so that the axes of said tube and said passage means are substantially parallel, rotor means in said stator tube comprising a plurality of discs each of which is arranged in an axially spaced relation with and between a pair of adjacent stator discs, means for rotating said rotor discs so as to move fluid in said stator tube in a direction such that the fluid will apply viscous shear stresses to said stator discs to thereby rotate said stator tube and bend said struts in a direction transversely of said passage means a distance related to the viscosity of fluid in said stator tube, and means operatively associated with said struts for continuously indicating the extent of bending thereof.

3. A viscometer comprising means forming a passage for a fluid to flow in one direction, diffuser means in said passage providing for laminar flow of fluid through a portion of said passage in said one direction, stator means comprising a tube and a plurality of ring shaped discs in said tube disposed in a fixed relation with respect to said tube and in an axially spaced relation with each other, flexure struts mounting said tube in said portion of said passage means so that the axes of said tube and said passage means portion are substantially parallel and said tube is adjacent to said diffuser means and downstream therefrom in said one direction, rotor means in said tube operable to move fluid in said tube in a direction such that the fluid will apply viscous shear stresses to said discs to thereby flex said struts in a direction transversely of said passage means amounts related to the viscosity of said fluid, and means operatively associated with said struts for continuously indicating the extent of flexing thereof.

4. A viscometer comprising means forming a passage for a fluid to flow in one direction, stator means comprising a tube and a plurality of ring shape discs in said tube disposed in a fixed relation with respect to said tube and in an axially spaced relation with each other, flexure struts mounting said tube in said passage means so that the axes of said tube and said passage means are substantially parallel, said struts being constructed so that they extend substantially radially of said stator tube and are readily flexible in response to rotary deflection of said stator tube, rotor means in said tube operable to move fluid in said tube in a direction such that the fluid will apply viscous shear stresses to said discs to thereby provide for rotary deffection of said stator tube and a consequent flexing of said struts in directions transversely of said passage means distances related to the viscosity of fluid in said stator tube, and strain gauges mounted on said struts and connected in a circuit for continuously indicating the extent of flexing of said struts.

References Cited

UNITED STATES PATENTS

| 2,484,761 | 10/1949 | Stock | 73—59 |
| 3,229,506 | 1/1966 | Bruss et al. | 73—59 |
| 3,269,171 | 8/1966 | Bruss et al. | 73—60 |

FOREIGN PATENTS

| 130,709 | 1960 | U.S.S.R. |

DAVID SCHONBERG, *Primary Examiner.*